United States Patent [19]

Emmoto et al.

[11] Patent Number: 5,281,910
[45] Date of Patent: Jan. 25, 1994

[54] TEST PATTERN SIGNAL GENERATOR AND INSPECTION METHOD OF DISPLAY DEVICE USING THE SAME

[75] Inventors: Kazuo Emmoto, Nagasaki; Makoto Terazono, Osaka, both of Japan

[73] Assignee: Mitsubishi Denki Kabushiki Kaisha, Tokyo, Japan

[21] Appl. No.: 863,104

[22] Filed: Apr. 3, 1992

[30] Foreign Application Priority Data

Jul. 1, 1991 [JP] Japan .................................. 3-185819

[51] Int. Cl.[5] .................................. G01R 31/02
[52] U.S. Cl. .................................. 324/158 R; 324/73.1
[58] Field of Search .................... 324/73.1, 158 R; 371/27; 340/870.28, 870.29, 870.3; 358/10, 139

[56] References Cited

U.S. PATENT DOCUMENTS

| | | | |
|---|---|---|---|
| 3,662,219 | 5/1972 | Knox | 324/73.1 |
| 3,888,772 | 6/1975 | Neuner | 340/870.29 |
| 4,213,119 | 7/1980 | Ward et al. | 340/870.29 |
| 4,257,033 | 3/1981 | Ota et al. | 340/870.29 |
| 4,267,594 | 5/1981 | Brunson | 324/73.1 |
| 4,268,818 | 5/1981 | Davis et al. | 340/870.28 |
| 4,294,682 | 10/1981 | Deczky | 340/870.28 |
| 4,298,839 | 11/1981 | Johnston | 340/870.28 |
| 4,510,803 | 4/1985 | Perara | 340/870.28 |
| 4,799,059 | 1/1989 | Grindahl et al. | 340/870.28 |
| 4,910,729 | 3/1990 | Coffelt et al. | 371/27 |
| 5,019,814 | 5/1991 | Biggs et al. | 340/870.28 |
| 5,077,621 | 12/1991 | Leslie et al. | 324/73.1 |
| 5,095,262 | 3/1992 | Henley et al. | 371/27 |

FOREIGN PATENT DOCUMENTS 61-21507 1/1986 Japan .
61-129945 6/1986 Japan .
2-148479 12/1990 Japan .

Primary Examiner—Ernest F. Karlsen
Attorney, Agent, or Firm—Burns, Doane, Swecker & Mathis

[57] ABSTRACT

In a test pattern signal generator, an infrared radiation generating section for generating a test pattern selecting infrared signal in response to a test pattern selecting signal given from a console box and a test pattern signal generating section for receiving the test pattern selecting infrared signal and for outputting a test pattern signal corresponding to the received signal are physically separate from one another. In an inspection method of a display device, the test pattern signal generator is used, and a display device to be inspected and adjusted and a test pattern signal generating section are connected through a cable. An infrared radiation generating section is installed at a prescribed position, and when the connected display device and the test pattern signal generating section enter a prescribed working area, a test pattern selecting signal is sent from a console box to the infrared radiation generating section.

2 Claims, 4 Drawing Sheets

FIG. 5 (PRIOR ART)
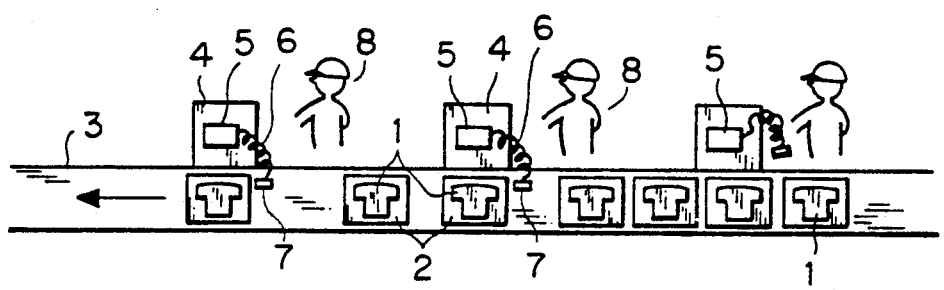
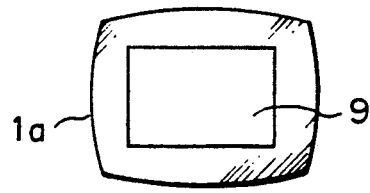
FIG. 6(A)
(PRIOR ART)
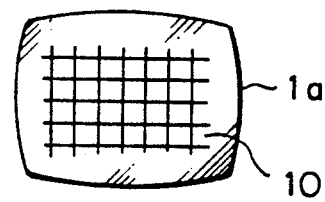
FIG. 6(B)
(PRIOR ART)

TEST PATTERN SIGNAL GENERATOR AND INSPECTION METHOD OF DISPLAY DEVICE USING THE SAME

BACKGROUND OF THE INVENTION

1. Field of the Invention

The present invention relates to a test pattern signal generator for generating test pattern signals to perform inspection and adjustment of a display device in manufacturing display devices using a CRT, a liquid crystal or the like, and to an inspection method of the display device using the test pattern signal generator.

2. Description of the Prior Art

FIG. 5 is a constitution diagram showing a prior art display device inspection and adjustment process. In FIG. 5, numeral 1 designates a display device to be inspected and adjusted, numeral 2 designates a palette holding the display device 1 thereon, numeral 3 designates a conveyer for conveying a plurality of palettes 2 in the direction indicated by the arrow, each palette 2 holding the display device 1, numeral 4 designates a plurality of workbenches arranged along the conveyer 3, numeral 5 designates a test pattern signal generator on each workbench 4, numeral 6 designates a cable led from the test pattern signal generator 5, numeral 7 designates a connector being installed at the top end of the cable 6 and connected to the display device 1, and numeral 8 designates a worker positioned next to each workbench 4 for performing inspection and adjustment.

Next, operation will be described.

When the palettes 2 each holding the display device 1 are conveyed on the conveyer 3, each worker 8 first connects the connector 7 to the display device 1. Next, an operation switch (not shown) on the test pattern signal generator 5 is operated, and a prescribed test pattern signal is selectively generated and then inputted through the cable 6 and the connector 7 to the display device 1.

The test pattern signal is mainly composed of a synchronous signal and a pattern data signal, and causes a prescribed test pattern to appear on a screen (1a FIG. 2) of the display device 1.

FIG. 6 shows examples of test patterns, where FIG. 6(a) shows an example of our all white raster 9 and FIG. 6(b) shows an example of a lattice pattern 10 on the screen 1a. Using such various test patterns, adjustment of various characteristics such as screen size, luminance, screen position, and the like is performed.

Since the inspection and adjustment work of the display device 1 in the prior art is performed as above described, the worker 8 must always connect the connector 7 to the display device 1 before performing inspection and adjustment, and must detach the connector 7 after finishing inspection and adjustment. Consequently, there is a drawback in that the work of individual worker 8 becomes bothersome, and working efficiency is decreased while fatigue is increased.

Also the test pattern signal generator 5 is constituted by an operation switch section for selecting test patterns and a test pattern signal source circuit section being integrated, and therefore becomes large scale. Since one test pattern signal generator of such large scale is allocated to each worker 8, problems exist in that the test pattern signal generator is inconvenient to handle.

SUMMARY OF THE INVENTION

In order to solve the above-mentioned problems in the prior art, a first object of the present invention is to provide a test pattern signal generator of small size capable of being handled easily.

A second object of the present invention is to provide a test pattern signal generator realizing an inspection and adjustment method wherein a worker performing inspection and adjustment need not connect or detach a connector directly.

A third object of the present invention is to provide an inspection method of a display device using a test pattern signal generator obtained by attaining the first and second objects.

In order to attain the first and second objects, a test pattern signal generator according to the present invention comprises an infrared radiation generating section for generating test pattern selecting infrared signals in response to externally applied test pattern selecting signals, and a test pattern signal generating section for receiving the test pattern selecting infrared signal 13 and for outputting a test pattern signal corresponding to the received signal. That is, in such an arrangement, in the test pattern signal generator, the infrared radiation generating section and the test pattern signal generating section are separated and so become smaller in size and lighter in weight respectively, thereby handling becomes more convenient.

In order to attain the third object, in an inspection method of a display device using a test pattern signal generator according to the present invention, the display device to be inspected and adjusted and the test pattern signal generating section are moved in a state that they are previously connected through a cable, and the infrared radiation generating section is installed at a prescribed position, and when the display device and the test pattern signal generating section to be moved enter a prescribed working area, the test pattern selecting signal is given to the infrared radiation generating section. That is, according to such method, since the worker to perform the inspection and adjustment work need not connect or detach the cable, working efficiency is improved.

The foregoing and other objects and novel features of the present invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 5 is a diagram showing inspection and adjustment of a display device in the prior art; and FIG. 6 is a diagram showing examples of test patterns formed by a test pattern signal generator.

DESCRIPTION OF THE PREFERRED EMBODIMENTS

Preferred embodiments of the present invention will be described in detail referring to the accompanying drawings as follows.

Figure 1:
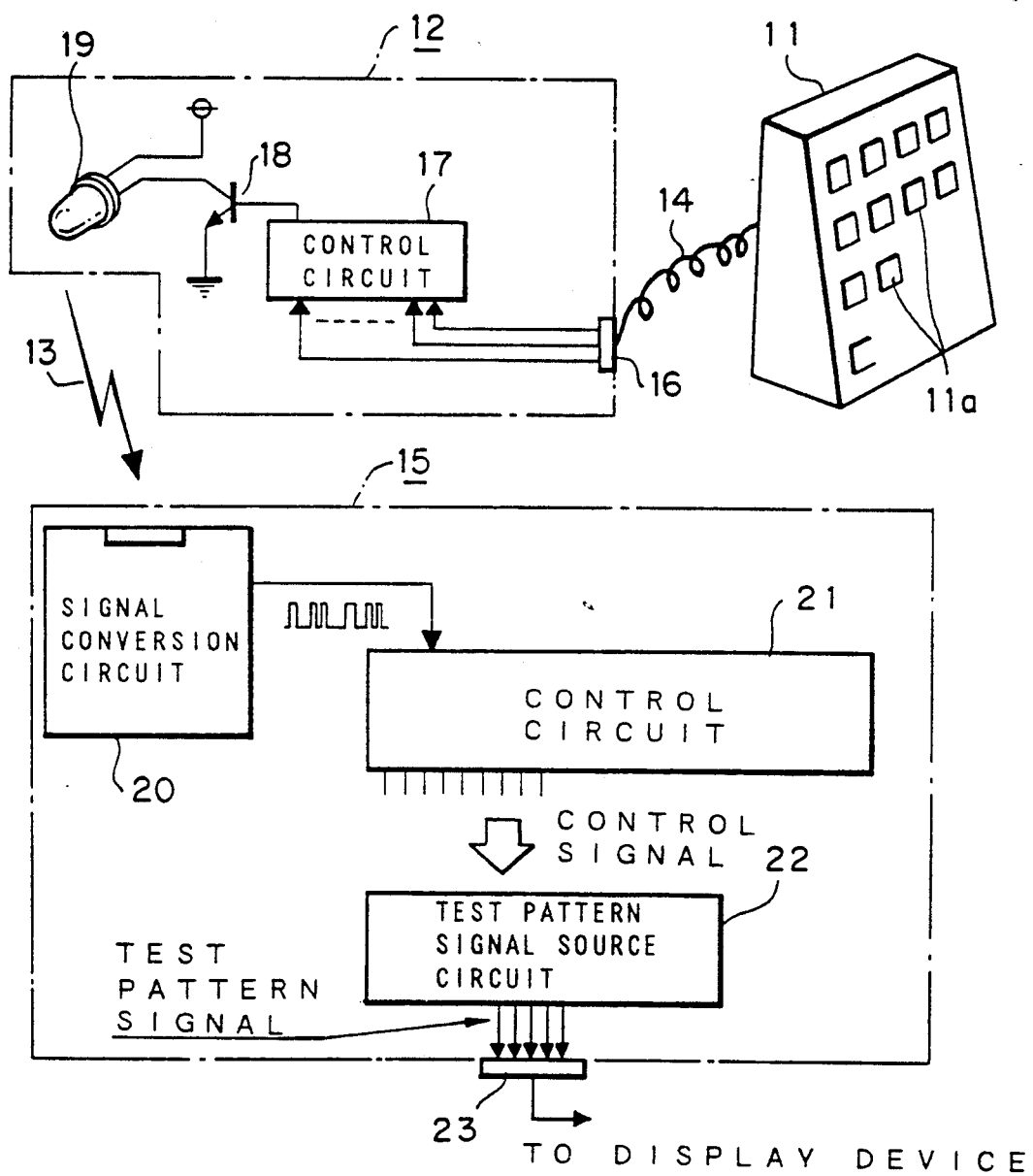
FIG. 1 is a partially schematic diagram of a test pattern signal generator according to an embodiment of the invention.

FIG. 1 is a diagram showing an embodiment of a test pattern signal generator according to the present invention.

In FIG. 1, numeral 11 designates a console box provided with operation switches 11a, numeral 12 designates an infrared radiation generating section for generating test pattern selecting infrared signals 13 in response to the operation of the operation switch 11a, numeral 14 designates a cable connecting the infrared radiation generating section 12 and the console box 11, and numeral 15 designates a test pattern signal generating section for receiving the test pattern selecting infrared signal 13 and for generating a test pattern signal.

The infrared radiation generating section 12 comprises an input terminal section 16 to which the cable 14 is connected, a control circuit 17 for generating a control signal in response to the test pattern selecting signal sent from the console box 11, a driving transistor 18 operated by the control signal from the control circuit 17, and an infrared lamp 19 for generating the test pattern selecting infrared signal 13 by driving in the transistor 18.

The test pattern signal generating section 15 comprises a signal conversion circuit 20 for receiving the test pattern selecting infrared signal 13 and for converting it into a pulse signal, a control circuit 21 constituted by microcomputers for outputting a control signal in response to the pulse signal, a test pattern signal source circuit 22 for generating a prescribed test pattern signal based on the control signal, and an output terminal 23 for outputting the test pattern signal.

Next, the operation will be described.

If the operation switch 11a of the console box 11 is operated and a desired test pattern is selected, a test pattern selecting signal is applied through the cable 14 and the input terminal 16 to the control circuit 17 of the infrared radiation generating section 12. The control signal 17 controls the transistor 18 in response to the test pattern selecting signal, whereby a test pattern selecting infrared signal 13 is generated from the infrared lamp 19.

The test pattern selecting infrared signal is received by the signal conversion circuit 20 of the test pattern signal generating section 15 and converted into a pulse signal and applied to the control circuit 21. The control circuit 21 applies a test pattern signal generating control signal to the test pattern signal source circuit 22. As a result, a prescribed test pattern signal is selected and outputted from the output terminal 23. The test pattern signal is used for the inspection and adjustment of the display device 1 as described later.

Further, the test pattern selecting signal may be inputted to the input terminal section 16 not only from the console box 11 but also from an automatic adjusting device or the like.

Figure 2:
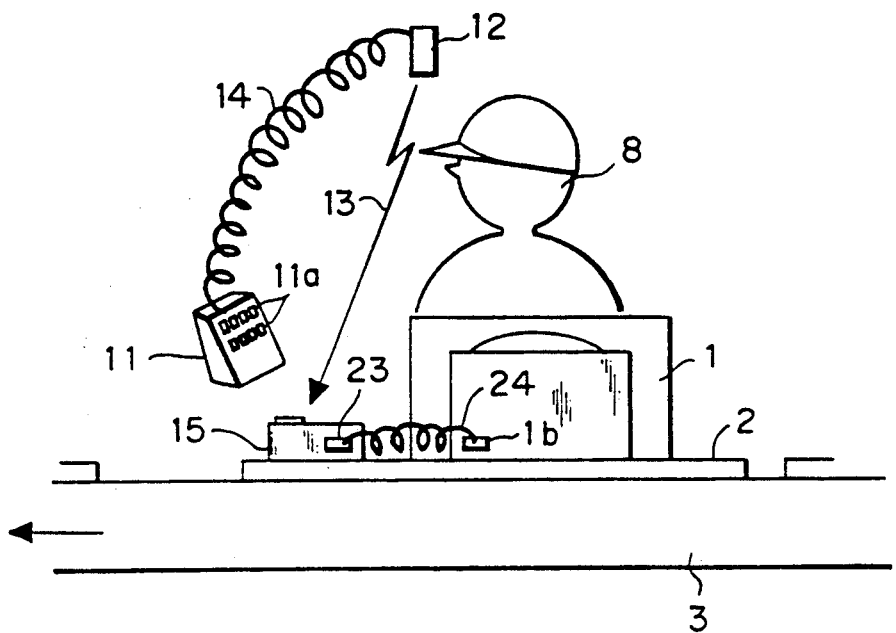
FIG. 2 is a diagram showing an inspection method of a display device using a test pattern signal generator according to an embodiment of the invention.
Figure 3:
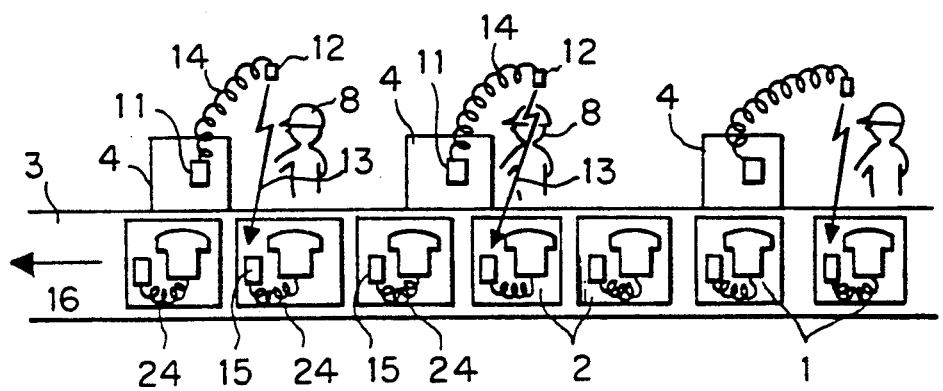
FIG. 3 is a diagram showing inspection and adjustment of a display device using a test pattern signal generator according to an embodiment of the invention.

FIG. 2 and FIG. 3 are diagrams showing an inspection method of a display device according to the present invention for performing the inspection and adjustment work of the display device using the test pattern signal generator. Further, in FIG. 2 and FIG. 3, parts corresponding to those in FIG. 1 and FIG. 5 are designated by the same reference numerals, and the description shall be omitted.

Figure 4:
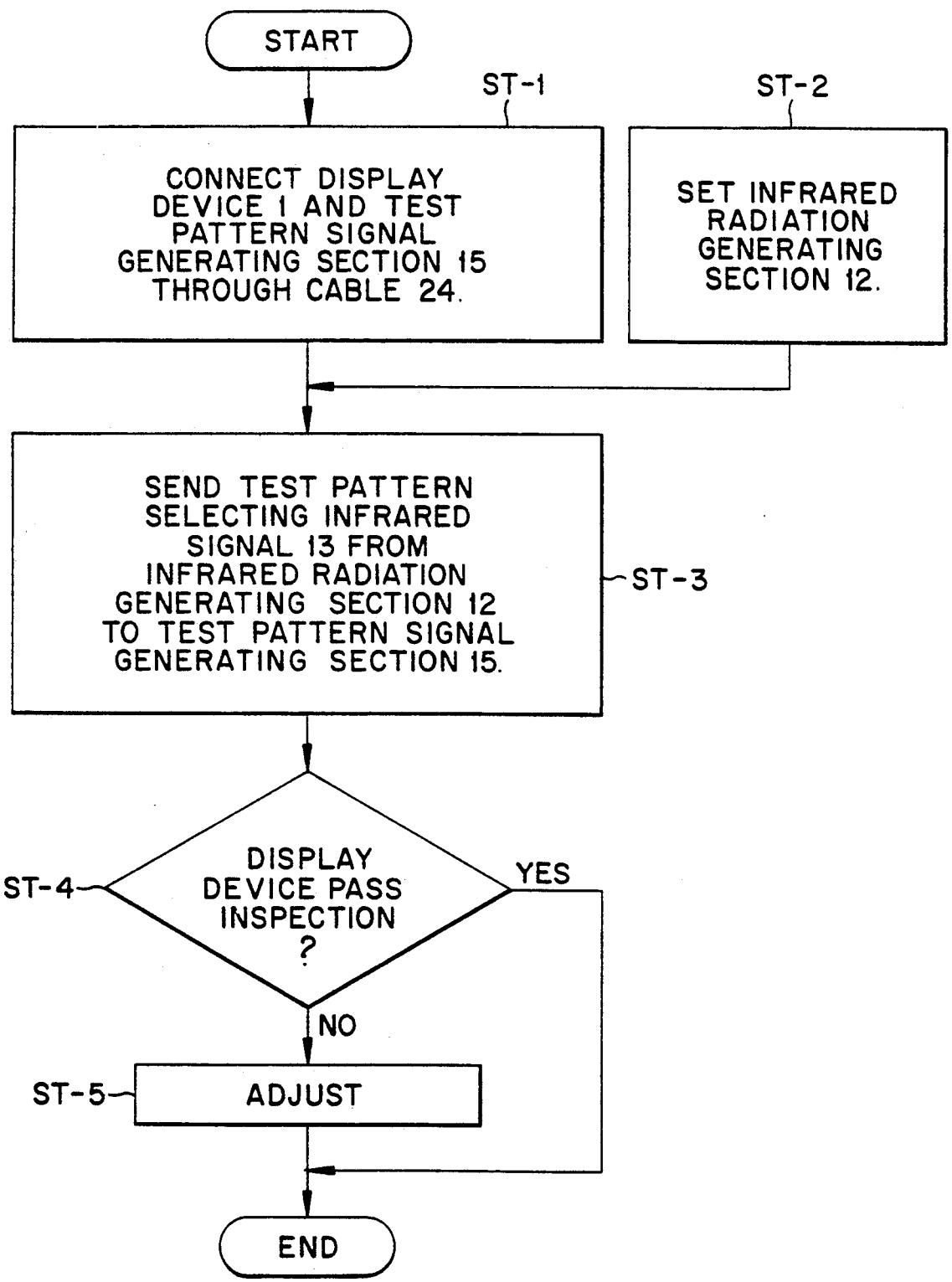
FIG. 4 is a flowchart showing an inspection method of a display device according to an embodiment of the invention.

In FIG. 2, FIG. 3 and the flowchart of FIG. 4, the display device 1 to be inspected and adjusted and the test pattern signal generating section 15 are held on the palette 2 sent by the conveyer 3. The test pattern signal generating section 15 and the display deice 1 are connected through a cable 24; step ST-1. The cable 24 has one end connected to the output terminal 23, and other end connected to a picture input terminal 1b provided on the display device 1.

Also the infrared radiation generating section 12 is installed at a prescribed position with respect to each worker 8; step ST-2. The test pattern selecting infrared signal 13 is transmitted towards the test pattern signal generating section 15; step ST-3. Further, the console box 11 is put on each workbench 4.

Next, the operation will be described.

The display device 1 and the test pattern signal generating section 15 are previously connected by the cable 24 and held on each palette 2 conveyed by the conveyer 3 (step ST-1). The connection work of the display device 1 and the test pattern signal generating section 15 is performed, for example, by a worker at the top of the inspection and adjustment line. Thus the connection work can be performed by a single worker, thereby the working efficiency can be improved in comparison to the case that each worker 8 for the inspection and adjustment work performs connection work individually.

The display device 1 and the test pattern signal generating section 15 are connected by the cable 24 and held on the palette 2, and when the palette 2 is sent to the work station of the worker 8, the worker 8 operates the operation switch 11a of the console box 11 and selects the test pattern. Thereby the infrared radiation generating section 12 sends the test pattern selecting infrared signal 13 to the test pattern signal generating section 15, and a prescribed test pattern signal is sent through the cable 24 to the display device 1 (step ST-3). The inspection and adjustment work is then performed (steps ST-4, ST-5).

If the inspection and adjustment work is finished, the palette 2 is sent intact to the downstream side. The work of detaching the cable 24 from the display device 1 can again be performed by the a single worker at the downstream side. Therefore, each worker 8 may perform only the inspection and adjustment work sequentially regarding the display device 1 sent sequentially, and need not connect or detach the cable 24. Consequently, the working efficiency as a whole is improved.

Also in the test pattern signal generator, since the infrared signal generating section 12 and the test pattern signal generating section 15 are separated and made small size and light weight respectively, it is convenient particularly when the test pattern signal generating section 15 is held on the palette 2 or detached from the palette 2.

As above described, according to the present invention, since the test pattern signal generator is separated into the infrared radiation generating section and the test pattern signal generating section, benefits are obtained in that respective sections are made small size and light weight and can be easily handled.

Also according to the present invention, since the infrared radiation generating section is arranged at a prescribed position, and the test pattern signal generating section and the display device are connected being sent to a worker, the worker need not connect or detach the cable but may perform the inspection and adjustment work only, thereby benefits are obtained in that the working efficiency is improved and fatigue of the worker can be reduced.

What is claimed is:

1. A method of inspecting a display device using a test pattern generator for generating test pattern signals to perform inspection and adjustment of the display device,
   - wherein said test pattern signal generator is provided with an infrared radiation generating section for generating a test pattern selecting infrared signal in response to a test pattern selecting signal applied from the outside, and a test pattern signal generating section physically separate from said infrared radiation generating section for receiving the test pattern selecting infrared signal and for outputting a test pattern signal corresponding to the received signal;
   - said inspection method comprising the steps of:
   - installing said infrared radiation generating section at a prescribed position;
   - connecting said display device and said test pattern signal generating section;
   - moving the connected display device and test pattern signal generating section; and
   - generating a test pattern selecting infrared signal from said infrared radiation generating section when said display device and said test pattern signal generating section to be moved enter a prescribed working area.

2. A method of testing a plurality of display devices, said method comprising the steps of:
   - providing a conveyor system arranged to convey each of said plurality of display devices past a plurality of work stations along said conveyor system;
   - providing a plurality of infrared generating sections respectively at each of said work stations, each of said infrared radiation generating sections being adapted to generate a test pattern selecting infrared signal in response to an externally-applied test pattern selecting signal;
   - connecting a plurality of test pattern signal generating sections, each physically separate from said infrared radiation gathering sections, to a respective one of said plurality of display devices to create a plurality of tester/display combinations;
   - conveying each of said plurality of tester/display combinations on said conveyor system sequentially past said plurality of work stations;
   - applying said test pattern selecting signal to an infrared radiation generating section of a work station as said tester/display combination passes said work station;
   - generating said test pattern selecting infrared signal using said infrared radiation generating section;
   - receiving said test pattern selecting signal with said test pattern signal generating section of said tester/display combination passing said work station; and
   - applying said test pattern signal to said display of said tester/display combination using said test pattern signal generating section of said tester/display combination in response to the received test pattern selecting signal.

* * * * *